F. P. LAWRENCE.
OPEN SLOT CONDUIT.
APPLICATION FILED DEC. 23, 1918.
1,350,658.
Patented Aug. 24, 1920.
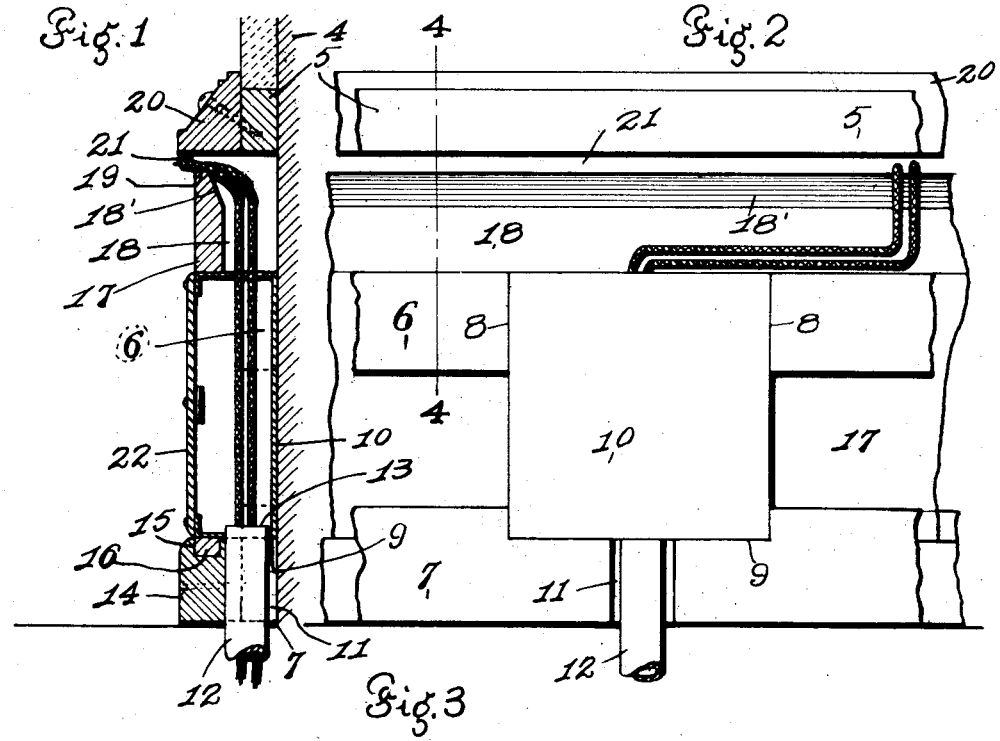

UNITED STATES PATENT OFFICE.

FRANKLIN P. LAWRENCE, OF UNIVERSITY CITY, MISSOURI.

OPEN-SLOT CONDUIT.

1,350,658.  Specification of Letters Patent.  Patented Aug. 24, 1920.

Application filed December 23, 1918. Serial No. 268,094.

*To all whom it may concern:*

Be it known that I, FRANKLIN P. LAWRENCE, a citizen of the United States, and resident of University City, county of St. Louis, and State of Missouri, have invented certain new and useful Improvements in Open-Slot Conduits, of which the following is a specification containing a full, clear, and exact description, references being had to accompanying drawings, forming a part thereof.

My invention relates to open slot conduits and has for its primary object a conduit, formed in the base board or in the ceiling molding, which is provided with a slot running its entire length so as to permit the insertion or removal of conducting wires in telephone, telegraph and signal installations.

A further object is to provide an open slot conduit located either in the base board or ceiling moldings of hotels, office buildings and the like, where frequent changes of wiring are necessary, without taking down a portion of the moldings or base boards as is common in structures used at the present time.

A further object is to provide a conduit formed in base boards or ceiling moldings in which wires may be placed without the aid of tools and the slot formed in the conduit be hidden from sight but remain open and fixed at all times.

In the drawings:

Figure 1 is a cross-sectional view of my device as secured adjacent the wall of a building.

Fig. 2 is a rear plan view showing the outlet box, the main conduit and the wires leading from the box lying within the molding, the entire device being removed from the wall.

Fig. 3 is a front view showing the cover of the outlet box and a pair of wires extending through the slot.

Fig. 4 is a cross-sectional view of the conduit taken on the line 4—4 of Fig. 2.

I have shown my device as preferably applied to the base board or molding which runs along the floor of a room but it is to be understood that I may also place it against the ceiling without departing from the spirit of my invention.

In the drawings, 4 represents a brick or tile wall to which are secured wooden strips 5, 6, and 7. These ground strips are of sufficient thickness so as to be flush with the wall when the same is plastered. The strip 6 is cut as indicated by the numeral 8 and the strip 7, as indicated by the numeral 9 so as to form a seat for the outlet box 10. The strip 7 is further recessed as indicated by the numeral 11 to receive the pipe conduit 12, this being known as the house conduit and being permanently secured in the walls or floor, the end 13 of this conduit extending into the outlet box 10. Secured to the strip 7 is a molding 14 which is secured thereto in any well known manner. This strip 14 is provided with a groove 15 into which the tongue 16 of a panel 17 is inserted. Near its upper end, the panel 17 is secured to the strip 6 in any well known manner.

The upper edge of the panel is provided with a rabbet or cut away portion 18 which provides a conduit or housing for the wires to lie in. The capacity of this conduit or housing is increased by leaving an open space between the strips 5 and 6, as illustrated in Fig. 1. The upper portion of the rabbet 18 is tapered or beveled as at 18', thus facilitating the insertion or removal of the conductors into or from the conduit.

A short distance above the edge 19 of the panel 17 is a molding 20 which is secured to the strip 5. This molding is of a greater width than the thickness of the panel 17, this excess width being approximately that of the slot 21, and tends to hide or conceal the slot or space 21 formed between the edge 19 of the panel and the molding 20 as well as to keep foreign substance from lodging within the conduit 18. On the face of the outlet box 10 is secured a plate 22, by which access may be had to this box.

From the foregoing, it will be observed that I provide a permanently open conduit at any position of which the electric wiring may be readily inserted or removed and housed without any special tools or appliances or without in any manner removing or marring any portion of the molding or panel, or disturbing in the least the interior finish of the room or corridor; and further without adding any appreciable expense to said construction. The conduit is especially designed for receiving and concealing conducting wires for telephone, telegraph and signal installations, or in other words, such wires as are not required to be incased in a special insulating conduit by the fire underwriter laws. The shape and formation of the conduit is preferably illustrated in Fig.

4, wherein the upper wall is formed by the lower edge of the ground strip 5 and the lower edge of the molding 20, and the lower wall of the conduit is formed by the upper edge of the ground strip 6 and the horizontal shoulder formed by the rabbet in the panel 17. The rear wall of the conduit is formed by the wall or support to which the strips 5 and 6 are secured and the open front wall is formed by the panel 17.

The dimensions of the conduit may be varied by the thicknesses of the strips 5 and 6 or the space between said strips may be filled in. In the event that the space between the strips 5 and 6 is filled in, a thicker panel is employed and a wider molding used and the rabbet in the panel 17 deepened. The vertical depth of the conduit may be varied by spacing the strips 5 and 6 and the width of the rabbet in the panel 17, varied accordingly.

Having fully described my invention, what I claim is:

1. A conduit for concealing telephone, telegraph and signal conductors comprising a panel provided on its inside face with a rabbet forming L-shaped channel or groove and with a beveled edge, said groove and beveled edge formed adjacent its upper edge, a molding having a width in excess of the thickness of the panel located above the upper edge of said panel and spaced apart therefrom so as to form between said edge and said molding a permanently open slot for the insertion and removal of electrical conductors.

2. A conduit for concealing telephone, telegraph and signal conductors comprising three parallel strips adapted to be attached to a support or wall, said strips being spaced apart so as to leave an open space therebetween, a panel provided with an L-shaped cut away portion on its upper inner edge secured to the lower two said strips and a molding located above the upper edge of said panel and spaced apart therefrom so as to form, between said edge and said molding, an open slot for the insertion or removal of electrical conductors, secured to the said strips, said molding being secured to the upper strip.

3. A conduit for concealing telephone, telegraph and signal conductors comprising a panel, the upper edge of which being provided with a tapered channel or groove formed on its inside face, and a detachable molding spaced apart from the channel and parallel therewith, said molding being wider than the thickness of the panel and projecting beyond the front face of the panel so as to conceal the space between the upper edge of the panel and the molding, and an outlet box located in said panel and communicating with the tapered channel or groove.

4. A conduit for concealing telephone, telegraph and signal conductors comprising strips adapted to be attached to a support or wall being spaced apart and parallel to each other so as to leave an open space between the same, a panel provided with a tapered cut away portion at its upper edge adjacent to one of said strips, a detachable molding spaced above the upper edge of the panel and secured to one of said strips, said space between the bottom edge of the molding and the upper edge of the panel forming an open slot for the insertion or removal of electrical conductors into and from said conduit, and an outlet box located in said panel and communicating with the groove formed in said panel.

In testimony whereof, I have signed my name to this specification, in presence of two subscribing witnesses.

FRANKLIN P. LAWRENCE.

Witnesses:
ELIZABETH CARTALL,
WALTER C. STEIN.